(12) United States Patent
Daniels

(10) Patent No.: US 6,609,497 B2
(45) Date of Patent: Aug. 26, 2003

(54) METHOD FOR DETERMINING MBT TIMING IN AN INTERNAL COMBUSTION ENGINE

(75) Inventor: Chao Fu Daniels, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 25 days.

(21) Appl. No.: 10/034,087

(22) Filed: Dec. 28, 2001

(65) Prior Publication Data
US 2003/0121499 A1 Jul. 3, 2003

(51) Int. Cl.[7] ................................................. F02P 5/153
(52) U.S. Cl. .................................. 123/406.43; 73/117.3
(58) Field of Search ........................... 123/406.43, 435; 73/117.3

(56) References Cited

U.S. PATENT DOCUMENTS

| | | |
|---|---|---|
| 4,063,538 A | 12/1977 | Powell et al. |
| 4,466,408 A | 8/1984 | Cheklich |
| 4,976,241 A * | 12/1990 | Ishida et al. ........... 123/406.43 |
| 5,027,773 A | 7/1991 | Shimomura et al. |
| 5,245,969 A | 9/1993 | Nishiyama et al. |
| 5,276,625 A | 1/1994 | Nakaniwa |
| 5,682,856 A | 11/1997 | Tomisawa et al. |

OTHER PUBLICATIONS

G.M. Rassweiler & L. Withrow, "Motion Pictures of Engine Flames Correlated with Pressure Cards." SAE Transactions, vol. 33, p. 185–204, May 1938.

Mark C. Sellnau, Frederic A. Matekunas, Paul A. Battiston, Chen–Fang Chang, & David R. Lancaster, "Cylinder–Pressure–Based Control Using Pressure–Ratio– Management and Low–Cost Non–Intrusive Cylinder Pressure Sensors." SAE 2000–01–0932. Mar. 6–9, 2000.

J. Cooper, Ford Motor Co. Report: "Comparison between Mapping MBT versus 50% Mass Fraction Burn MBT." Nov. 6, 1997.

* cited by examiner

Primary Examiner—Erick Solis
(74) Attorney, Agent, or Firm—Brinks Hofer Gilson & Lione (57) ABSTRACT

Maximum braking torque timing in an internal combustion engine can be determined by calculating the net pressure change in an engine cylinder during combustion. The second derivative of the net pressure change is then calculated. The spark timing of the engine is then varied until the maximum acceleration point of the net pressure change is aligned with top dead center.

15 Claims, 6 Drawing Sheets

METHOD FOR DETERMINING MBT TIMING IN AN INTERNAL COMBUSTION ENGINE

FIELD OF THE INVENTION

This invention relates to a method and system for controlling an internal combustion engine. More specifically, the invention relates to technology for determining the maximum braking torque spark timing of the combustion process of an internal combustion engine.

BACKGROUND

Traditionally, maximum braking torque timing was determined through spark sweep. Unless requested by an operating condition for delayed spark timing, almost every calibration point required a spark sweep to determine if the engine could be operated at the maximum braking torque timing condition. A certain degree of safety margin was needed to avoid pre-ignition or knock if the engine could not be operated at maximum braking torque timing. This open loop spark mapping required significant effort to achieve a satisfactory calibration.

Various closed-loop spark timing control schemes utilize cylinder pressure measurements or spark ionization sensing. Based on testing data observation, the peak pressure in such schemes usually occurs around 15 degrees after top dead center (ATDC) at maximum braking torque timing; the 50% mass fraction burned occurs between 7 and 9 degrees after top dead center at maximum braking torque timing. A separate algorithm controls pressure ratio management (PRM(10)) around 0.55 to obtain the maximum braking torque timing.

Since these criteria are based on observations and may change at different operating conditions, each algorithm needs some calibration. The required calibration makes the determination of maximum braking torque timing complicated and somewhat inaccurate. In addition, it is clear that the combustion process must be matched with the engine cylinder volume change to attain the best torque. Maximum braking torque timing conditions should thus be determined efficiently based on a variety of parameters, and the observed "usual" occurrence of peak pressure may not always apply.

SUMMARY OF THE INVENTION

The primary object of this invention is therefore to provide a more efficient method for determining the maximum braking torque timing in an internal combustion engine. The above object is accomplished according to the principle of this invention by first calculating the net pressure change in an engine cylinder during the combustion process. The second derivative of the net pressure change is then calculated, the result of which represents the acceleration of the net pressure change. The spark timing of the engine is then advanced or retarded until the maximum acceleration point of the net pressure change is aligned with top dead center. This spark timing represents the maximum braking torque timing of the engine.

BRIEF DESCRIPTION OF THE DRAWINGS

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PRESENTLY PREFERRED EMBODIMENTS

A typical spark ignited internal combustion engine includes a number of cylinders in which combustion occurs. An air-fuel mixture is supplied to each of the combustion cylinders and is then ignited by a spark generated by a spark plug. The exhaust gas generated by the combustion within the cylinders is exhausted from an exhaust valve and guided to a catalytic converter.

Figure 1:
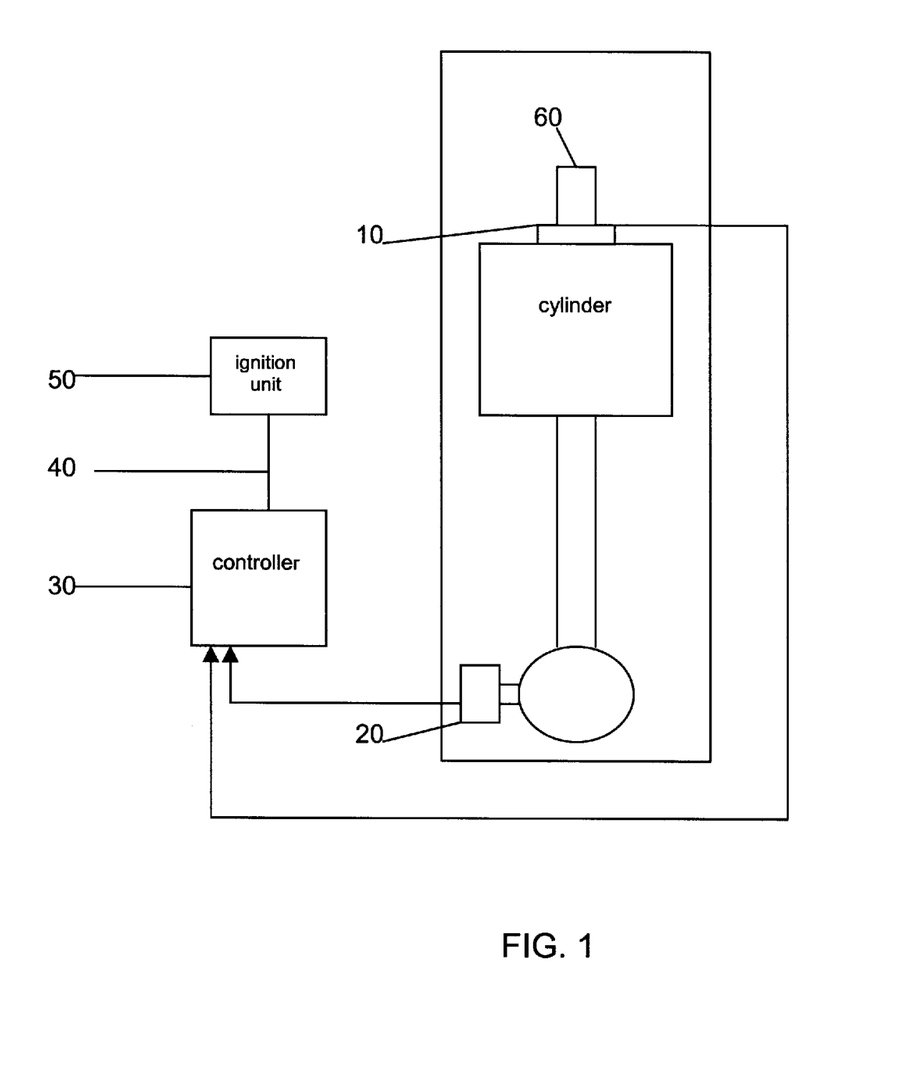
FIG. 1 is a diagram illustrating a system for determining the maximum braking torque timing in an internal combustion engine according to the present invention.

FIG. 1 is a diagram illustrating a system for determining maximum braking torque timing in an internal combustion engine. In FIG. 1, an engine cylinder is provided with a cylinder pressure sensor 10. The cylinder pressure sensor 10 measures the internal pressure of the cylinder during the combustion process. The cylinder pressure sensor 10 further produces detection signals in accordance with the combustion pressure measured in the cylinder. In one embodiment of the system, the cylinder pressure sensor 10 is located inside the cylinder at the base of an ignition plug 60. In this configuration, the cylinder pressure sensor 10 faces directly inside the cylinder to measure the cylinder pressure. In another embodiment of the system, the cylinder pressure sensor 10 is a piezo-electric element fitted as a washer to the ignition plug 60.

A crank angle sensor 20 is also provided within the engine. The crank angle sensor 20 detects a crank angle corresponding to the rotational position of the engine. More precisely, it generates, for example, a reference angle pulse at each reference crank angle (at each 180 degrees in the case of a four cylinder engine) and a unit angle pulse at each unit angle (at each rotation of one degree) of the crank shaft of the engine. The crank angle can be determined by counting the number of unit angle pulses generated after a reference angle pulse. The crank angle sensor 20 is disposed within an engine accessory that rotates synchronously with engine revolution, such as the distributor 25, for monitoring the crankshaft angular position.

The cylinder pressure sensor 10 and the crank angle sensor 20 are coupled to a controller 30. The controller 30 can be operative as hardware, software, or a combination of either. The controller 30 may be constituted as a microcomputer comprising a microprocessor, input/output devices, interface components, and memory. The controller 30 is equipped to receive input signals from the cylinder pressure sensor 10 and the crank angle sensor 20. The input signals transmit the cylinder pressure measurements ouput from the cylinder pressure sensor 10, along with the corresponding crank angle output from the crank angle sensor 20, to the controller 30.

Controller 30 performs predetermined operations using these signals and controls the operation of the engine, including the ignition timing, by outputting the necessary control signals in response to the performed operations. The controller 30 is coupled to an ignition power unit 50, which receives as input an ignition timing signal 40 output from the controller 30. In one embodiment of the invention, the primary coil of the ignition power unit 50 is charged according to the ignition timing signal 40 output from the controller 30 to supply the voltage to the ignition plug 60. The control operation of the ignition timing is well known in the art. The phrase "coupled with," as used herein, means coupled either directly or indirectly via one or more intervening elements.

Figure 2:
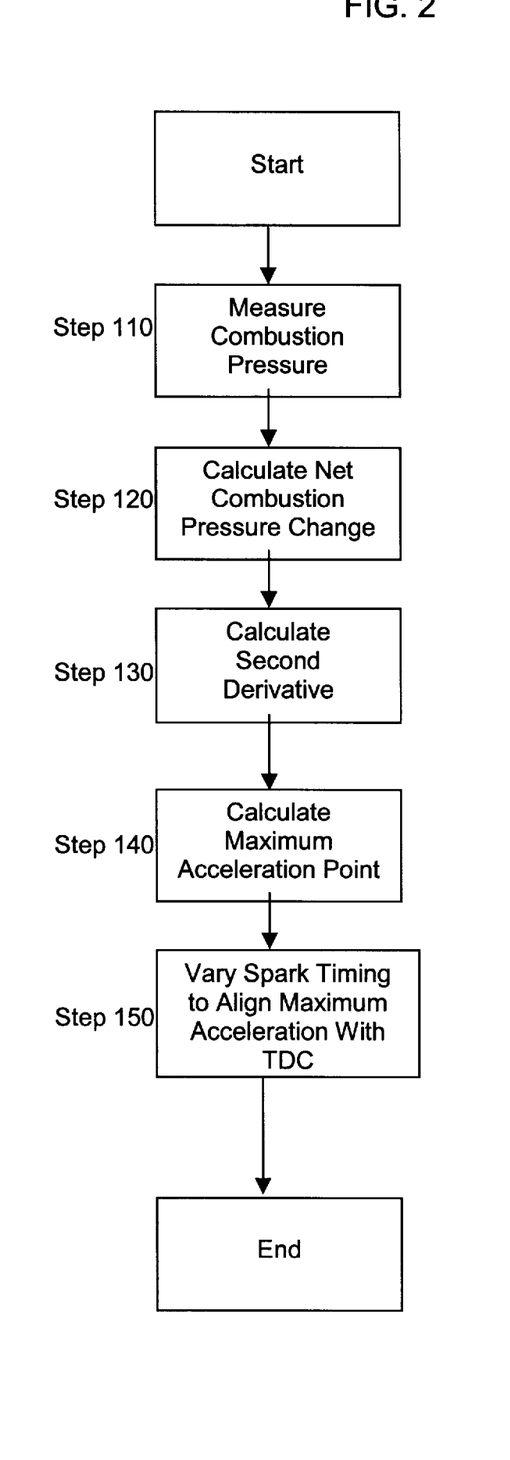
FIG. 2 is a flow chart for a method of controlling an internal combustion engine according to the present invention.
Figure 3:
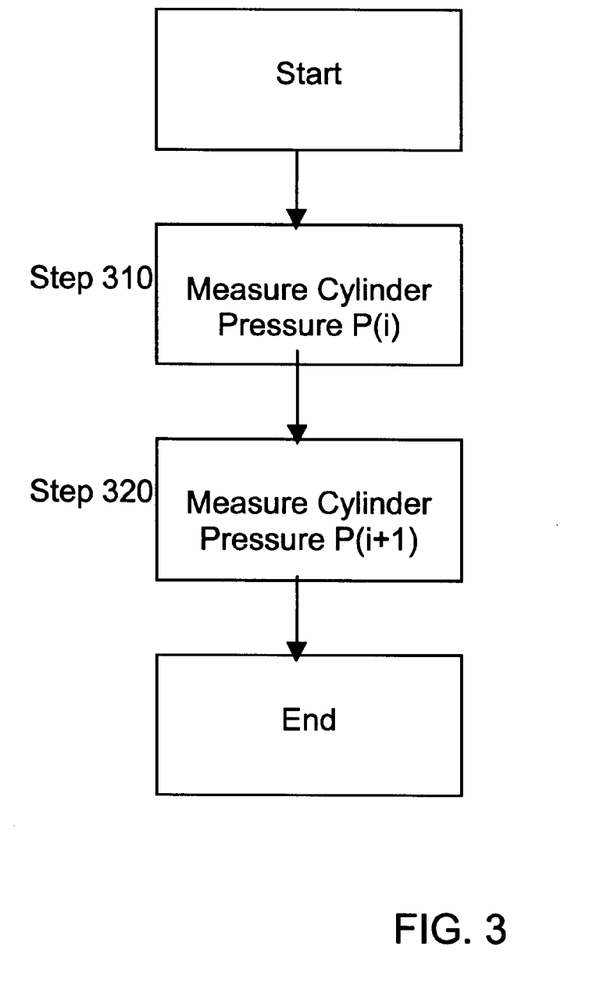
FIG. 3 is a more detailed flow chart of a portion of the method depicted in FIG. 2.

FIG. 2 is a flow chart illustrating the method of controlling an internal combustion engine according to the present invention. In Step 110, the combustion pressure is measured in a cylinder of an internal combustion engine during a combustion cycle. In a preferred embodiment of the disclosed invention, Step 110 is further characterized by the process shown in FIG. 3. Once the combustion process begins, a measurement of the cylinder pressure P(i) is taken (Step 310, FIG.3). After an interval of a crank angle of one degree, another measurement of the cylinder pressure P(i+1) is taken (Step 320, FIG. 3). In an alternative embodiment, the measurement of pressure at Step 320 will be taken after a predetermined amount of time. In another alternative embodiment, Steps 310 and 320 can be repeated for the entire combustion cycle.

In an alternative embodiment, the step of measuring the combustion pressure in a cylinder preferably comprises using a combustion pressure sensor to measure the combustion pressure in the cylinder. The combustion pressure sensor may be mounted partially inside the cylinder. In an alternative embodiment, the combustion pressure sensor may be mounted on an interior surface of the cylinder.

In the next Step 120 of FIG. 2, the net combustion pressure change is calculated. This step preferably comprises the following calculations. At every crank angle after the ignition, the difference between pressure P(i+1) and the pressure at the previous crank angle P(i) is calculated. The pressure difference resulting from combustion between these two crank angles can be calculated according to the following equation:

$$P(i+1)-P(i)*(V(i)/V(i+1))^{1.3}$$

To calculate the net pressure without any volume change since ignition, the pressure difference is compared with the volume at the ignition point. The net pressure change between the two crank angles can then be found according to the following equation:

$$dP(i)=(P(i+1)-P(i)*(V(i)/V(i+1))^{1.3})*V(i)/V_{ig}$$

The net pressure at each crank angle can be calculated according to the following equation:

$$P_{net}(i)=P_{net}(i-1)+dP(i)$$

where P is pressure, V is volume, and $V_{ig}$ is the chamber volume at the ignition point.

This calculation of net pressure change will typically be performed by a controller over a predetermined range of crank angles. This range will typically include the ignition crank angle to ninety degrees after the ignition crank angle. The controller will calculate the net pressure change after every crank angle according to the above equations and store the respective values over the course of the combustion process in memory. The controller further monitors the crank angle that corresponds to the calculated net pressure change and stores the crank angle value in memory. In the preferred embodiment of the invention, the controller will be the power train control system that exists in the engine.

Figure 4:
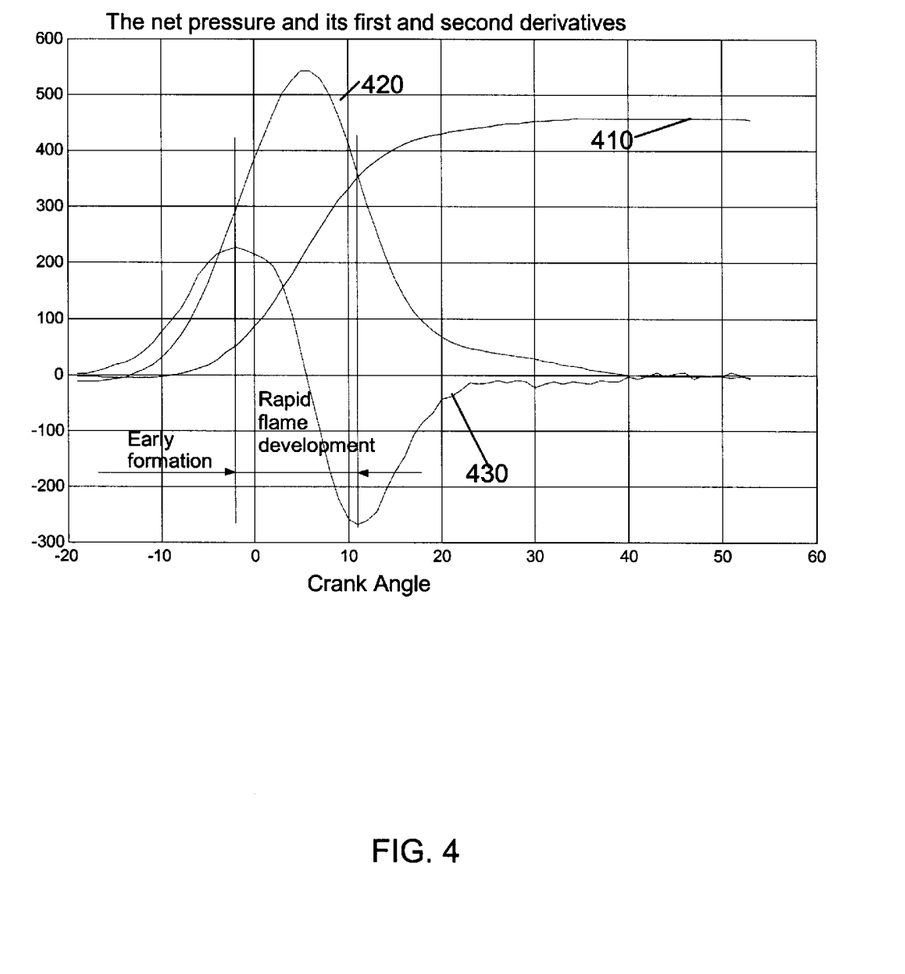
FIG. 4 is a graphical representation of one embodiment of the invention.

A graphical representation of net pressure plotted versus crank angle, according to one embodiment of the claimed invention, is shown by Curve 410 of FIG. 4. The curve represents the results of calculations of the above equation $P_{net}(i)=P_{net}(i-1)+dP(i)$ over a range of crank angles from the ignition crank angle to 40 degrees after top dead center.

In Step 130 of FIG. 2, the second derivative of the net combustion pressure change is calculated. This second derivative is preferably calculated by a controller. The equation $P_{net}(i)=P_{net}(i-1)+dP(i)$ represents the net pressure change that is calculated by the same controller in Step 120. The acceleration of this net pressure is represented by the second derivative of the above equation. Preferably, the controller is programmed to calculate a second derivative of the above equation over a predetermined range of crank angles. This range is preferably the same range that the controller uses to calculate the net pressure change in Step 120. In a preferred embodiment of this invention, the range will include a crank angle of 10 degrees before top dead center to a crank angle of 10 degrees after top dead center. The controller will calculate the acceleration of the net pressure change at every crank angle over the predetermined range and store the respective values.

A graphical representation of net pressure acceleration plotted versus crank angle, according to one embodiment of the claimed invention, is shown by Curve 430 of FIG. 4. This curve was generated by using the calculations of Step 130 over a range of crank angles from the ignition crank angle to 40 degrees after top dead center.

In the next Step 140 of FIG. 2, the maximum acceleration point during combustion is calculated from the second derivative of the net combustion pressure change. This calculation is preferably performed by a controller.

In operation, the controller monitors the acceleration values calculated in Step 130 over the specified range of crank angles. After all of the acceleration values are monitored, the controller detects the crank angle at which the maximum acceleration value is achieved. The controller performs this calculation by detecting the largest positive acceleration value it receives. The controller then records the crank angle that corresponds to that acceleration value. This crank angle represents the maximum acceleration point of the combustion process.

In Step 150 of FIG. 2, the spark timing of the engine is advanced by a controller to the point where the maximum acceleration point is aligned with the top dead center. It is at this point that the maximum braking torque timing is achieved.

In operation, the controller is programmed to monitor the crank angle that corresponds to the maximum acceleration point calculated in Step 140 at an initial spark timing value. If the controller determines that the maximum acceleration point does not occur at a crank angle of zero degrees top dead center, the controller is programmed to change the spark timing of the engine. The controller will advance the spark timing if the maximum acceleration point occurs after top dead center, or the controller will retard the spark timing if the maximum acceleration point occurs before top dead center.

After the controller changes the spark timing of the engine, Steps 110 through 140 of FIG. 2 are repeated. After performing its programmed operations, the controller determines if the maximum acceleration point occurs at top dead center. The controller will repeat the above process in Step 150 until the detected crank angle is equal to zero degrees top dead center. When the crank angle at which maximum acceleration occurs is zero degrees top dead center, the controller outputs an ignition timing control signal that is the maximum braking torque spark timing of the engine. The ignition timing control signal controls the spark timing of the internal combustion engine. The control signal is relayed to an ignition power unit, which provides the necessary voltage to the ignition plug in the cylinder.

In the case where the engine has a plurality of cylinders, the same operations as herein described in Steps 110 through 150 of FIG. 2 are performed for the each of the cylinders. In an alternative embodiment, even when the engine has a plurality of cylinders, the operations as described in FIG. 2 are only performed in one of the cylinders because the relative combustion pressures in each cylinder will be nearly identical.

FIG. 4 is a graphical representation of one embodiment of the invention. The net pressure change for the combustion process according to Step 120 of FIG. 2 is plotted versus crank angle, resulting in Curve 410 of FIG. 4. Curve 420 is the first derivative of the net pressure change for the combustion process, which represents the velocity of the net pressure change. The second derivative of the net pressure change for the combustion process calculated according to Step 130 of FIG. 2 is plotted versus crank angle, resulting in Curve 430 of FIG. 4. Curve 430 represents the acceleration of the net pressure change.

Figure 5:
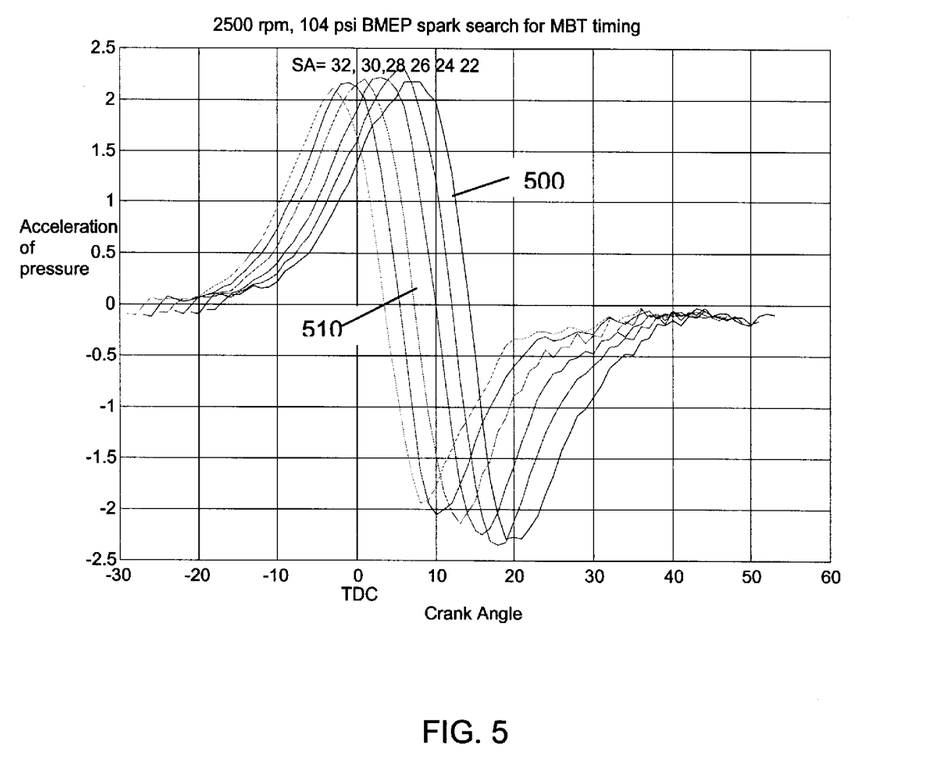
FIG. 5 is a graph illustrating the net pressure acceleration curves for various spark timing values.

During exemplary tests of one embodiment of the claimed invention, the engine conditions were set at an engine speed of 2500 revolutions per minute and 7.86 bar BMEP. The spark timing of the engine was set at 22 degrees before top dead center. As the engine at these operating conditions progressed through a combustion cycle, Steps 110 through 130 as shown in FIG. 2 were performed. Curve 500 in FIG. 5 represents the net pressure acceleration curve at the spark timing of 22 degrees before top dead center.

This process was then repeated for spark timing values of 24, 26, 28, 30, and 32 degrees before top dead center. FIG. 5 is a graph of the net pressure acceleration curves for the different spark timing values. As is shown by Curve 510, the peak acceleration of the net pressure change occurs near a crank angle of zero degrees top dead center at the spark timing of 28 degrees before top dead center. The efficiency of the combustion process is determined by the point at which this maximum acceleration occurs.

The most efficient work of the combustion process is accomplished after top dead center. As is shown in FIG. 4, the combustion process reaches its maximum acceleration point at a relatively early stage. If this maximum acceleration point is achieved before top dead center, some of the work generated by combustion will be wasted before top dead center. If the maximum acceleration point is attained after top dead center, the work generated during combustion will occur at a larger cylinder volume, which results in lower combustion efficiency. Therefore, the rapid burning period of combustion should start at top dead center, which allows for the most useful work to be generated in the most efficient manner. When the spark timing is advanced to the point where the maximum acceleration point aligns with top dead center, the most efficient work is generated from the combustion process and maximum braking torque timing is achieved.

Figure 6:
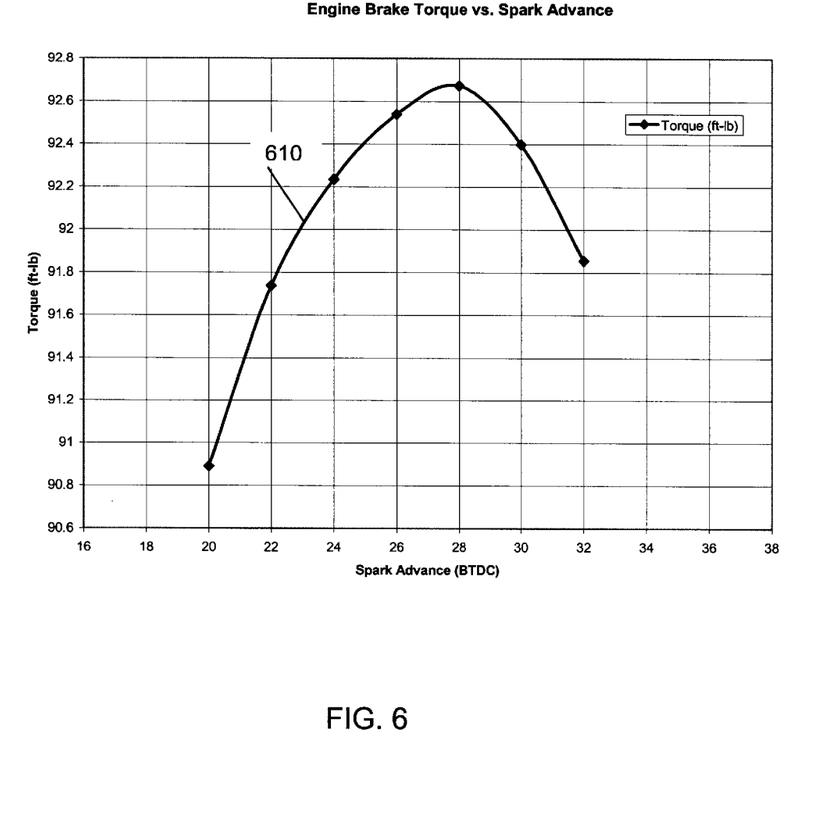
FIG. 6 is a graph illustrating the engine brake torque value at various spark timing values.

In FIG. 6, Curve 610 represents the engine brake torque value at various spark timing values for engine conditions of 2500 rpm and 7.86 bar BMEP. The maximum engine brake torque is reached at a spark timing of 28 degrees before top dead center. As shown previously in FIG. 5, at the maximum braking torque timing of 28 degrees before top dead center represented by Curve 510, the peak of the pressure acceleration curve is located close to top dead center. The spark timing of 28 degrees before top dead center is therefore the maximum braking torque spark timing of an internal combustion engine with engine conditions set at 2500 rpm and 7.86 bar BMEP.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

I claim:

1. A method of controlling an internal combustion engine, said engine having at least one cylinder, said method comprising the steps of:
    measuring the combustion pressure in said at least one cylinder at at least two discrete times during a combustion cycle;
    calculating a net combustion pressure change in said at least one cylinder based on said measured combustion pressures;
    calculating the second derivative of said net combustion pressure change;
    calculating the maximum acceleration point of said net combustion pressure change from said second derivative of said net combustion pressure change; and
    varying the spark timing of said engine until said maximum acceleration point is aligned with top dead center to achieve maximum braking torque spark timing.

2. A method of controlling an internal combustion engine as claimed in claim 1, wherein said combustion pressures are measured using a combustion pressure sensor.

3. A method of controlling an internal combustion engine as claimed in claim 1, wherein said measuring step further comprises measuring the combustion pressure in only one cylinder.

4. A method of controlling an internal combustion engine as claimed in claim 1, wherein said net combustion pressure change in said at least one cylinder is calculated using a controller.

5. A method of controlling an internal combustion engine as claimed in claim 1, wherein said second derivative of said net combustion pressure change is calculated using a controller.

6. A method of controlling an internal combustion engine as claimed in claim 1, wherein said maximum acceleration point of said net combustion pressure change is calculated using a controller.

7. A method of controlling an internal combustion engine as claimed in claim 1, wherein said spark timing of said engine is advanced to achieve maximum braking torque spark timing.

8. A method of controlling an internal combustion engine as claimed in claim 1, wherein said spark timing of said engine is retarded to achieve maximum braking torque spark timing.

9. A method of maximizing the efficiency of the combustion process of an internal combustion engine, said engine having at least one cylinder, said method comprising the steps of:

calculating a net combustion pressure change in said at least one cylinder during said combustion process;

calculating the second derivative of said net combustion pressure change;

deriving a maximum acceleration point from said second derivative of said net combustion pressure change; and varying the spark timing of said at least one cylinder of said engine until said maximum acceleration point of said net combustion pressure change is aligned with top dead center of said combustion process.

10. A method of maximizing the efficiency of the combustion process of an internal combustion engine as claimed in claim 9, wherein said second derivative of said net combustion pressure change is calculated using a controller.

11. A method of controlling an internal combustion engine, said engine having at least one cylinder, said method comprising the steps of:

measuring the combustion pressure in said at least one cylinder at at least two discrete intervals of a crank angle of at least one degree during a combustion cycle;

calculating a net combustion pressure change in said at least one cylinder based on said measured combustion pressures;

calculating the second derivative of said net combustion pressure change;

calculating the maximum acceleration point of said net combustion pressure change from said second derivative of said net combustion pressure change; and varying the spark timing of said engine until said maximum acceleration point is aligned with top dead center to achieve maximum braking torque spark timing.

12. A method of controlling an internal combustion engine as claimed in claim 11, wherein said combustion pressures are measured using a combustion pressure sensor.

13. A method of controlling an internal combustion engine as claimed in claim 11, wherein said measuring step further comprises measuring the combustion pressure in only one cylinder.

14. A method of controlling an internal combustion engine as claimed in claim 11, wherein said spark timing of said engine is advanced to achieve maximum braking torque spark timing.

15. A method of controlling an internal combustion engine as claimed in claim 11, wherein said spark timing of said engine is retarded to achieve maximum braking torque spark timing.

* * * * *